United States Patent
Shotan

(10) Patent No.: US 12,214,802 B1
(45) Date of Patent: Feb. 4, 2025

(54) AUGMENTING POINT CLOUD DATA WITH ARTIFICIAL RETURN POINTS

(71) Applicant: Waymo LLC, Mountain View, CA (US)

(72) Inventor: Gil Shotan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 289 days.

(21) Appl. No.: 17/864,181

(22) Filed: Jul. 13, 2022

Related U.S. Application Data

(60) Provisional application No. 63/221,716, filed on Jul. 14, 2021.

(51) Int. Cl.
*B60W 60/00* (2020.01)
*G01S 17/89* (2020.01)

(52) U.S. Cl.
CPC ......... *B60W 60/0011* (2020.02); *G01S 17/89* (2013.01); *B60W 2554/40* (2020.02)

(58) Field of Classification Search
CPC ........... B60W 60/0011; B60W 2554/40; G01S 17/89
See application file for complete search history.

(56) References Cited

U.S. PATENT DOCUMENTS

2021/0004017 A1\* 1/2021 Colgate ................. G01C 21/30

OTHER PUBLICATIONS

Hu et al., "What you See is What You Get: Exploiting Visibility for 3D Object Detection," Proceedings of the IEEE/CVF Conference on Computer Vision and Pattern Recognition (CVPR), 2020, pp. 11001-11009.

\* cited by examiner

*Primary Examiner* — Michael D Lang
(74) *Attorney, Agent, or Firm* — Lowenstein Sandler LLP

(57) ABSTRACT

Aspects and implementations of the present disclosure relate to augmenting point cloud data with artificial return points. An example method includes: receiving point cloud data comprising a plurality of return points, each return point being representative of a reflecting region that reflects a beam emitted by a sensing system, and generating a plurality of artificial return points based on presence or absence of return points along radial paths of beams emitted from the sensing system.

20 Claims, 12 Drawing Sheets

US 12,214,802 B1

AUGMENTING POINT CLOUD DATA WITH ARTIFICIAL RETURN POINTS

CROSS-REFERENCE TO RELATED APPLICATION(S)

This application claims the benefit of priority of U.S. Provisional Patent Application No. 63/221,716, filed on Jul. 14, 2021, the disclosure of which is hereby incorporated by reference herein in its entirety.

TECHNICAL FIELD

The instant specification generally relates to autonomous vehicles. More specifically, the instant specification relates to improving object identification and in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend significantly on timely and accurate identification of various objects present in the driving environment, and on the ability of a driving algorithm to quickly and efficiently process the information about the environment and provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures.

SUMMARY

Figure 1:
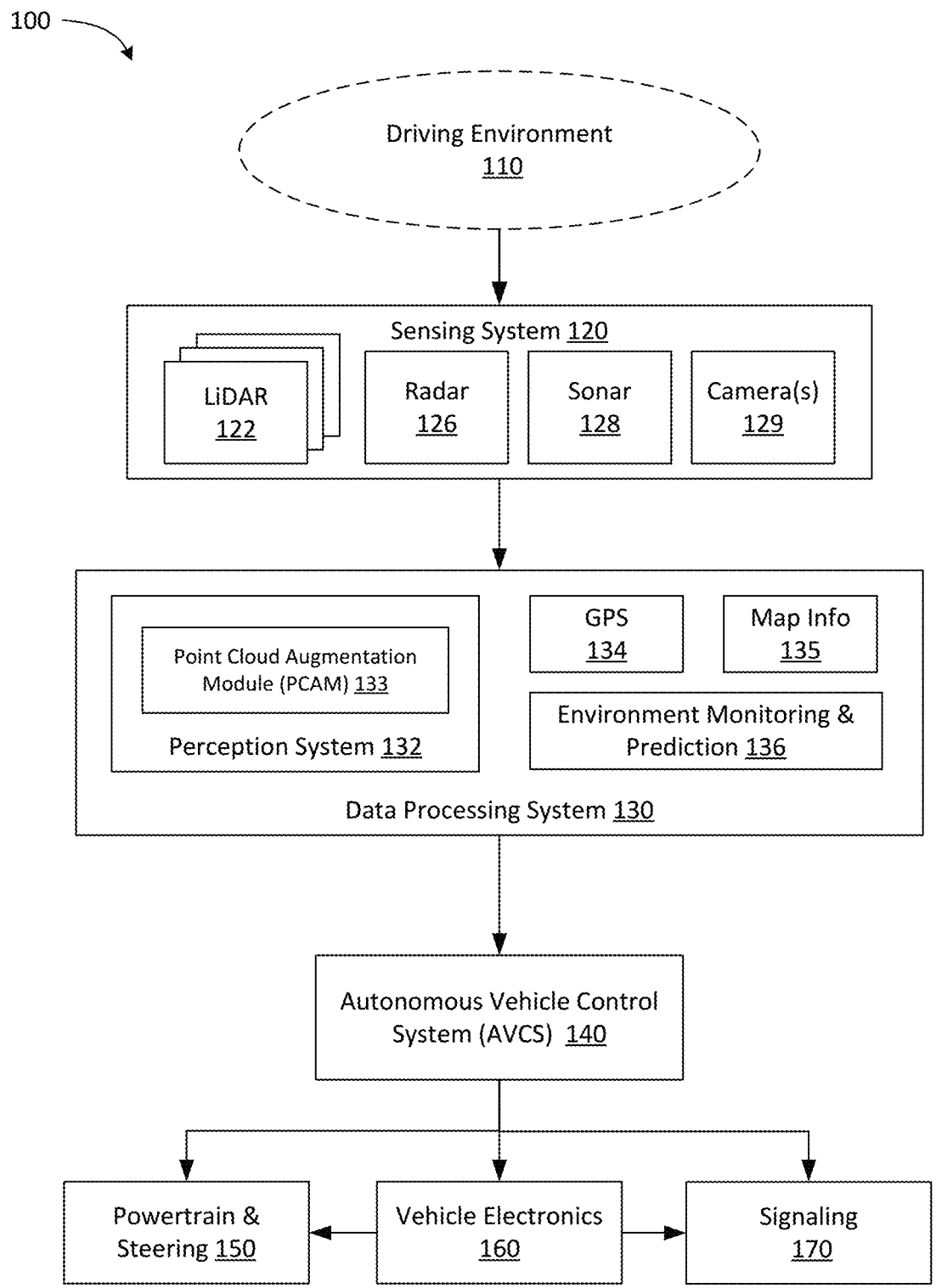
FIG. 1 is a diagram illustrating components of an example autonomous vehicle that uses object identification and tracking, in accordance with some implementations of the present disclosure.

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the present disclosure, a method comprises: receiving, by a data processing system of an autonomous vehicle (AV), point cloud data comprising a plurality of return points, each return point being representative of a reflecting region that reflects a beam emitted by a sensing system; generating a plurality of artificial return points based on presence or absence of return points along radial paths of beams emitted from the sensing system, wherein the artificial return points are representative of probable free space along the radial paths; generating augmented point cloud data that comprises the plurality of return points and the plurality of artificial return points; and causing a driving path of the AV to be determined based on the augmented point cloud data.

In at least one embodiment, generating the plurality of artificial return points comprises: generating, for at least one return point, one or more artificial return points representative of occluded space along a respective radial path of the return point, the one or more artificial return points having a larger radial distance from the sensing system than the return point.

In at least one embodiment, generating the plurality of artificial return points comprises: generating, for at least one return point, one or more artificial return points representative of free space along a respective radial path of the return point, the one or more artificial return points having a smaller radial distance from the sensing system than the return point.

In at least one embodiment, generating the plurality of artificial return points comprises: identifying a non-overlapping beam region between a pair of artificial return points representative of free space along adjacent radial paths; and generating at least one artificial return point representative of occluded space in the non-overlapping beam region.

In at least one embodiment, generating the plurality of artificial return points comprises: generating one or more artificial return points representative of probable free space along a radial path for which a return point is absent, wherein each artificial return point representative of probable free space comprises an intensity value indicative of a likelihood of an object within a reflectivity range being detectable at a location of the artificial return point.

In at least one embodiment, the intensity value is computed as a minimum detectable target reflectivity based on a radial distance of the artificial return point from the sensing system and a signal detection threshold of the sensing system.

In at least one embodiment, generating the plurality of artificial return points comprises: generating the one or more artificial return points only within a pre-defined range of return points present along the radial paths and along radial paths of adjacent beams.

In another aspect of the present disclosure, a data processing system of an autonomous vehicle is configured to perform any implementation of the method described above.

In another aspect of the present disclosure, a non-transitory computer-readable medium has instructions stored thereon that, when executed by a computing device, cause the computing device to perform any implementation of the method described above.

DETAILED DESCRIPTION

An autonomous vehicle can employ a light detection and ranging (LiDAR) technology to detect distances to various objects in the environment and, sometimes, the velocities of such objects. A LiDAR emits one or more laser signals (pulses) that travel to an object and then detects arrived signals reflected from the object. By determining a time delay between the signal emission and the arrival of the retro-reflected waves, a time-of-flight (ToF) LIDAR can determine the distance to the object.

ToF LiDARs are capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that between consecutive signals (frames) the object does not change its position appreciably in relation to other objects of the environment, but still long enough to allow the LiDAR to accurately detect the changes in the object's position. However, ToF LiDAR devices are generally incapable of determining velocities of objects based on a single sensing frame.

Coherent LiDARs take advantage of a phase information encoded into transmitted signals and carried by the emitted electromagnetic waves to the target and back and provide additional functionality unavailable in the standard ToF LiDAR technology. A coherent LiDAR detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent LiDAR allows, in addition to obtaining the range information, associating a radial velocity with the return points of the point cloud (radial velocimetry). This additional information enables velocity reconstruction and tracking of various objects by determining the character of the (translational and rotational) motion performed by the objects. In particular, a motion of a rigid body (such as a body of a car, a truck, an airplane, etc.) is typically constrained by a condition that a distance between two arbitrarily chosen points of the body remains fixed (constant) over the course of its motion. As a consequence, a motion of a rigid body can be described as a combination of a translational motion, which can be described by a translational vector velocity $\vec{V}$ (hereinafter, "velocity") and a rotational motion, which can be described by an angular velocity $\vec{\Omega}$ (hereinafter, "angular velocity").

Frequency-modulated continuous-wave (FMCW) LiDAR can provide both range information and radial velocity by linearly "chirping" the frequency of a continuous optical signal. The chirp is generally allowed to rise for a time sufficient for the signal to reach an object from which the signal will be reflected. The reflected signal is mixed with a local oscillator and the detector measures the differences in frequency. Processing the differences in frequencies at different portions of the chirped signal can be used to compute the Doppler shift, which is proportional to the object's radial velocity relative to the sensor.

A typical LiDAR emits signals in multiple directions to obtain a wide view of the outside environment. For example, a transmitter of a LiDAR device can cover an entire 360-degree view in a series of consecutive frames identified with timestamps. "Frame" or "sensing frame," as used herein, can refer to the entire 360-degree view of the environment obtained, or, alternatively, to any smaller sector, e.g., a 1-degree, 5-degree, a 10-degree, or any other angle obtained. Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include return points from multiple objects. Typically, it is not known a priori how many objects are within a given frame. A single object, such as another vehicle, a road sign, a pedestrian, and so on, as well as the autonomous vehicle itself, can generate multiple return points. For example, a 10-degree frame can include return points from one or more road signs, multiple vehicles located at various distances from the LiDAR device (mounted on the autonomous vehicle) and moving with different speeds in different directions, a pedestrian crossing a roadway, walking along a sidewalk, or standing by the roadside, and many other objects.

If there happen to be no objects in the direction of the emitted beam, then no light is reflected back toward the sensor. Alternatively, if the object is semi-transparent or narrower than the width of the beam, only some of the light will be reflected back toward the sensor and some of the light will continue through. If there is another object behind the first one, then the sensor might receive more than one reflected pulses back. In addition to being represented by its coordinates in three-dimensional (3D) space, return points can have other associated characteristics such as intensity of the reflected pulse, which correlates to the reflectivity of the object, and the width of the pulse.

A shortcoming of existing technologies that utilize point cloud representations of return points is that that they only contain data that report positive detections (actual reflections from objects) and neglect to report negative detections. Thus, point cloud representations fail to capture the full extent of the information contained in lidar measurements. When a LiDAR sensor emits a beam toward the object, return points are represented by a collection of points in 3D space. A consumer of point cloud data given this set of points knows only that an object exists at the location of the points. However, the consumer is not aware that the existence of the points suggest that the path from the sensor to the object is clear. Furthermore, the consumer is not aware that potentially other beams were emitted in other directions but did not produce any return points. This suggests that the path is likely clear in that direction as well, but there is less confidence in this assertion as there is no proof in the form of a return point.

This shortcoming is even more apparent when multiple LiDAR sensors are present in an environment. An additional LiDAR device can view the environment from a sufficiently different perspective from the primary LiDAR device. Even without generating return points, negative information about the environment exists that could be valuable for the purposes of detection and classification that is not captured in a point cloud representation. However, point cloud data contains only points, and is not able to capture such insights.

Aspects and implementations of the present disclosure address these and other shortcomings of the existing technologies by augmenting point cloud data with artificial return points based on inferences made with respect to the presence and absence of return points. For example, in certain implementations, a special type of return point is used to represent regions of the environment for which there is no corresponding return point (referred to herein as an "artificial return point"), and is used to supplement point cloud data that includes traditionally generated return points. This approach can be used to represent a continuous measure of the environment, indicating the likelihood that a given region in space is occupied (rather than a binary occupied/not occupied indication from traditional return points), as well as represent occluded space.

Aspects of the present disclosure integrate free space information into point cloud representations, which advantageously provide significant performance improvement in machine learning algorithms that operate on point cloud data, such as PointNet. Aspects of the present disclosure further facilitate the use of multiple LiDAR sensors to generate and combine augmented point cloud data. For example, in some implementations, artificial return points can be generated from point cloud data for which return points from multiple LiDAR sensors have been merged into a single set of return points. Such implementations may be extended to applications beyond AVs, such as residential and commercial security systems.

Aspects of the present disclosure further facilitate filtering out of spurious return points from the environment, such as those generated from fog, rain, dust, etc.

Aspects of the present disclosure provide a further advantage of utilizing/repurposing the fields (e.g., range, intensity, and/or velocity) of existing return point data to convey additional information about the environment that can serve as input to a machine learning model. For example, the intensity field of detected return points is a measure of the amount of energy returned by a reflected signal, which can be converted into a quantitative measure of confidence that the area is clear of objects along a radial path.

FIG. 1 is a diagram illustrating components of an example autonomous vehicle (AV) 100 that uses object identification and tracking (e.g., Doppler-assisted identification and tracking), in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g., farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object)

as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more LiDAR sensors 122 (e.g., LiDAR rangefinders), which can be a laser-based unit capable of determining distances (e.g., using ToF technology) to the objects in the driving environment 110. The LiDAR sensor(s) can utilize wavelengths of electromagnetic waves that are shorter than the wavelength of the radio waves and can, therefore, provide a higher spatial resolution and sensitivity compared with the radar unit. The LiDAR sensor(s) can include a coherent LiDAR sensor, such as an FMCW LiDAR sensor. The LiDAR sensor(s) can use optical heterodyne detection for velocity determination. In some implementations, the functionality of a ToF and coherent LiDAR sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple LiDAR sensor(s) 122 units can be mounted on AV, e.g., at different locations separated in space, to provide additional information about a transverse component of the velocity of the reflecting object.

The LiDAR sensor(s) 122 can include one or more laser sources producing and emitting signals and one or more detectors of the signals reflected back from the objects. The LiDAR sensor(s) 122 can include spectral filters to filter out spurious electromagnetic waves having wavelengths (frequencies) that are different from the wavelengths (frequencies) of the emitted signals. In some implementations, the LiDAR sensor(s) 122 can include directional filters (e.g., apertures, diffraction gratings, and so on) to filter out electromagnetic waves that can arrive at the detectors along directions different from the retro-reflection directions for the emitted signals. The LiDAR sensor(s) 122 can use various other optical components (lenses, mirrors, gratings, optical films, interferometers, spectrometers, local oscillators, and the like) to enhance sensing capabilities of the sensors.

In some implementations, the LiDAR sensor(s) 122 can be 360-degree unit in a horizontal direction. In some implementations, the LiDAR sensor(s) 122 can be capable of spatial scanning along both the horizontal and vertical directions. In some implementations, the field of view can be up to 90 degrees in the vertical direction (so that at least a part of the upper hemisphere is covered by the LiDAR signals). In some implementations, the field of view can be a full sphere (consisting of two hemispheres). For brevity and conciseness, when a reference to "LiDAR technology," "LiDAR sensing," "LiDAR data," and "LiDAR," in general, is made in the present disclosure, such reference shall be understood also to encompass other electromagnetic sensing technology, such as the radar technology, where applicable.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the LiDAR data, the perception system 132 can determine the distance from the rock to the AV and, therefore, by combining the distance information with the angular size of the rock, the perception system 132 can determine the linear dimensions of the rock as well.

In another implementation, using the LiDAR data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

In some implementations, the perception system 132 includes a point cloud augmentation module (PCAM) 133. The PCAM 133 can receive one or more sensor data frames from the sensing system 120. Each of the sensor frames can include multiple points. Each point can correspond to a reflecting surface from which a signal emitted by the sensing system 120 (e.g., by an FMCW sensor of LiDAR sensor(s) 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from synchronizer data or clock data, e.g., based on the known frequency of rotation of the transmitter within the horizontal plane. The velocity data can be provided to PCAM 133 by LiDAR sensor(s) 122, in one implementation, based on Doppler-assisted sensing technology. PCAM 133 can use one or more algorithms to various sets of points and augment the sets of points to include artificial return points descriptive of the environment, which can be used by the perception system 132 for efficient and reliable detection and tracking of objects.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120. In some implementations, the environment monitoring and prediction component 136 may utilize a machine learning model, such as a decision tree, a support-vector machine, or a neural network model that utilizes augmented point cloud data generated by the PCAM 133 as input. The machine learning model can be trained on point cloud data and images of stationary and moving objects (e.g., vehicles).

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
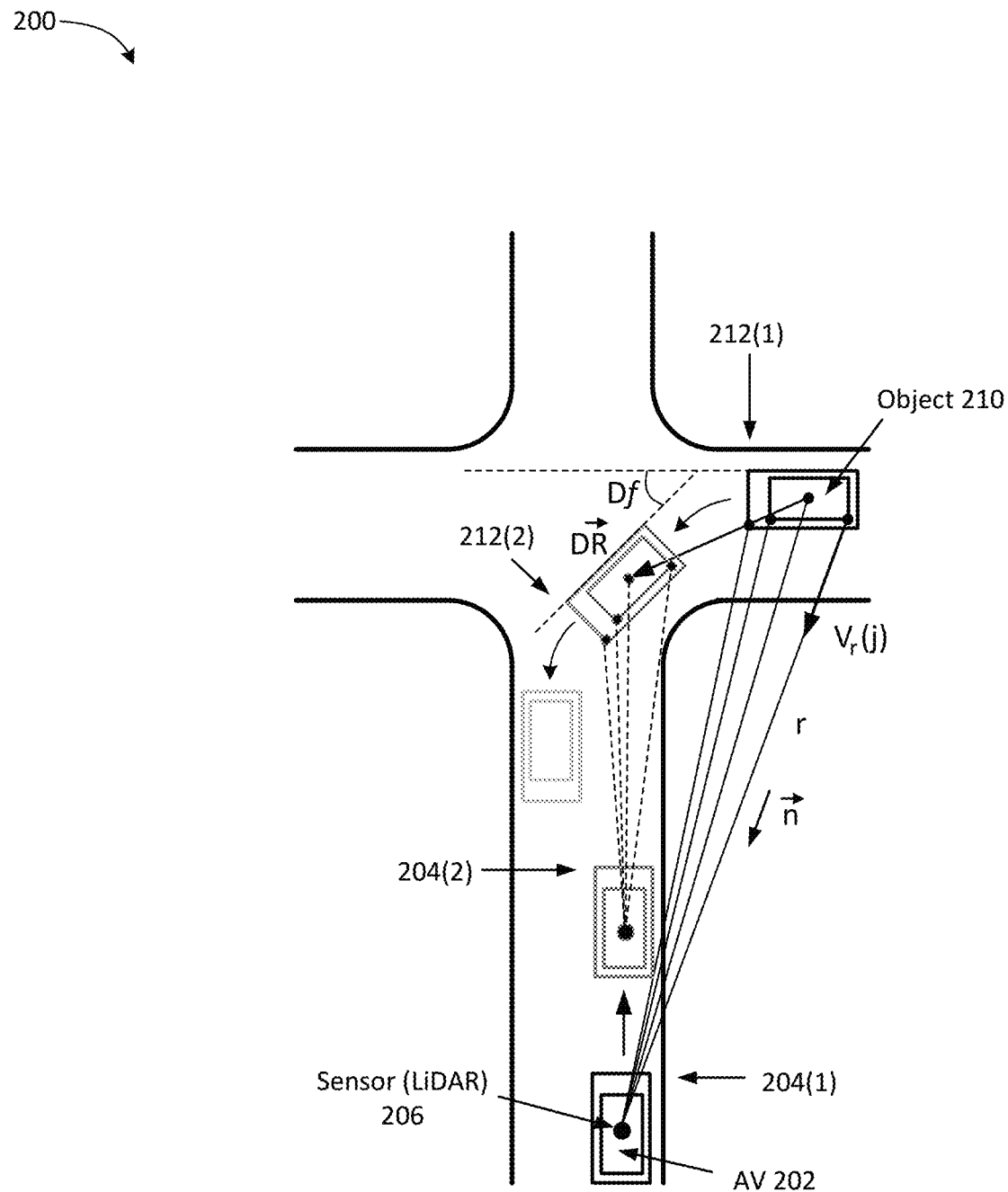
FIG. 2 is an illustration of a Doppler-assisted object identification and tracking setup that utilizes velocity reconstruction, as part of a perception system of an autonomous vehicle, in accordance with some implementations of the present disclosure.

FIG. 2 is an illustration 200 of a Doppler-assisted object identification and tracking setup that utilizes velocity reconstruction, as part of a perception system of an autonomous vehicle, in accordance with some implementations of the present disclosure. Depicted in FIG. 2 is AV 202 (which can be AV 100 or any other AV) approaching an intersection. The AV 202 has a sensor 206, which can be a LiDAR, such as a coherent LiDAR, an FMCW LiDAR, a hybrid coherent/ToF LiDAR, a combination of a coherent and incoherent LiDAR. etc., or any other device that allows to sense the radial velocity information in addition to the range (distance) information. The sensor 206 performs scanning of the driving environment of AV 202. In particular, the sensor 206 can sense multiple return points for each sensing frame. The sensing frames can be separated by time increments Δτ. The time increments refer to time differentials between signals emitted into (or returned from) the same direction, as different directions can be probed with signals at slightly different times. More specifically, Δτ can be a duration of the sensor (e.g., LiDAR transmitter) cycle (e.g., a period of revolution of the sensor's transmitter); with N points around the full 360-degree horizontal view, so that any two adjacent directions of sensing can be probed with the time lead/lag of Δτ/N.

An object 210 (e.g., a car, a truck, a bus, a motorcycle, or any other object) can be approaching the intersection and making a left turn, as depicted in FIG. 2. Two consecutive locations of AV, e.g., 204(1) and 204(2), corresponding to two consecutive LiDAR frames taken at times τ and τ+Δτ are shown. Similarly, the locations of object 210 for the two frames τ and τ+Δτ are shown as 212(1) and 212(2), respectively.

It should be understood that the displacement of AV 202 and object 210 shown in FIG. 2 between two consecutive frames is exaggerated for illustrative purposes and that, in reality, various objects can change their locations over the time increment Δτ much less significantly than depicted. For example, there can be numerous frames obtained by sensor 206 while object 210 completes the left-hand turn depicted in FIG. 2.

Object 210 performs a combination of a translational motion and a rotational motion. For example, some reference point of the object 210 is translated by vector $\Delta \vec{R}$ and the object 210 is rotated around this reference point by angle Δφ. In a flat driving environment, it can be sufficient to describe rotational motion via a single-component value Δφ, but in non-flat 3D (in particular, flying or nautical) environments, the rotation angle can be a vector Δφ whose three components describe pitch angle, yaw angle, and roll angle, respectively. The angular velocity of the object 210 characterizes the rate at which the object 210 is rotating (turning), $\vec{\Omega} = \Delta \vec{\phi} / \Delta \tau$. The linear velocity of the reference point similarly determines the rate at which the object 210 is translating, $\vec{V} = \Delta \vec{R} / \Delta \tau$. Provided that the object 210 is rigid, the knowledge of the angular velocity $\vec{\Omega}$ and the linear velocity $\vec{V}$ of some reference point O (with coordinates $\vec{R}_O$) can enable to determine the velocity of other points.

As shown in FIG. 2, at location 212(1) object 210 can reflect a number of signals (indicated by solid lines) output by the sensor 206 and generate a number of return points (shown with black circles) of the first frame. The return points should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) toward (or away from) the sensor 206: $V_r(j) = \vec{V}(j) \cdot \vec{n}$. In some implementations, only some of the return points can include the radial velocity values. For example, while ToF range measurements can be performed for each return point, only some (e.g., every fifth, tenth, and so on) of the points can be probed with the coherent LiDAR and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.).

At location 212(2), the object 220 can similarly reflect a new set of signals (indicated by dashed lines) output by the sensor 206 and generate a number of return points of the second frame. One or more mapping algorithms implemented by perception system 132 can determine a geometric transformation that maps the point cloud of the first frame onto the point cloud of the second frame. Such mapping can use the iterative closest point (ICP) algorithm which iteratively revises the transformation and minimizes an error metric (e.g., the mean squared error or some other predetermined metric) based on the comparison of the transformed first point cloud with the second point cloud (or vice versa). In some implementations, other mapping algorithms can be used, such as the Kabsch algorithm, the Procrustes superimposition, and the like. Although only two sensing frames (with respective points clouds) are depicted for conciseness, similar mappings can be generated between various consecutive sensing frames (e.g., between the second frame and the third frame, between the third frame and the fourth frame, etc.) for both object identification and tracking.

As the object 210 travels moving from location 212(1) to location 212(2), the return points in the second frame correspond to reflection surfaces of the object 210 that may be different from the surfaces causing reflections of the signals of the first frame. For example when parts of the rotating object 210 previously obscured come within a field of view of sensor 206, additional return points can be detected. Conversely, some of the previously exposed return points can be absent (as the respective physical reflecting surfaces disappear from view), and so on. To address such dynamic aspect of point clouds, the algorithms executed by perception system 132 can determine bounding boxes of various identified objects, which can be 3D bounding boxes.

Figure 3:
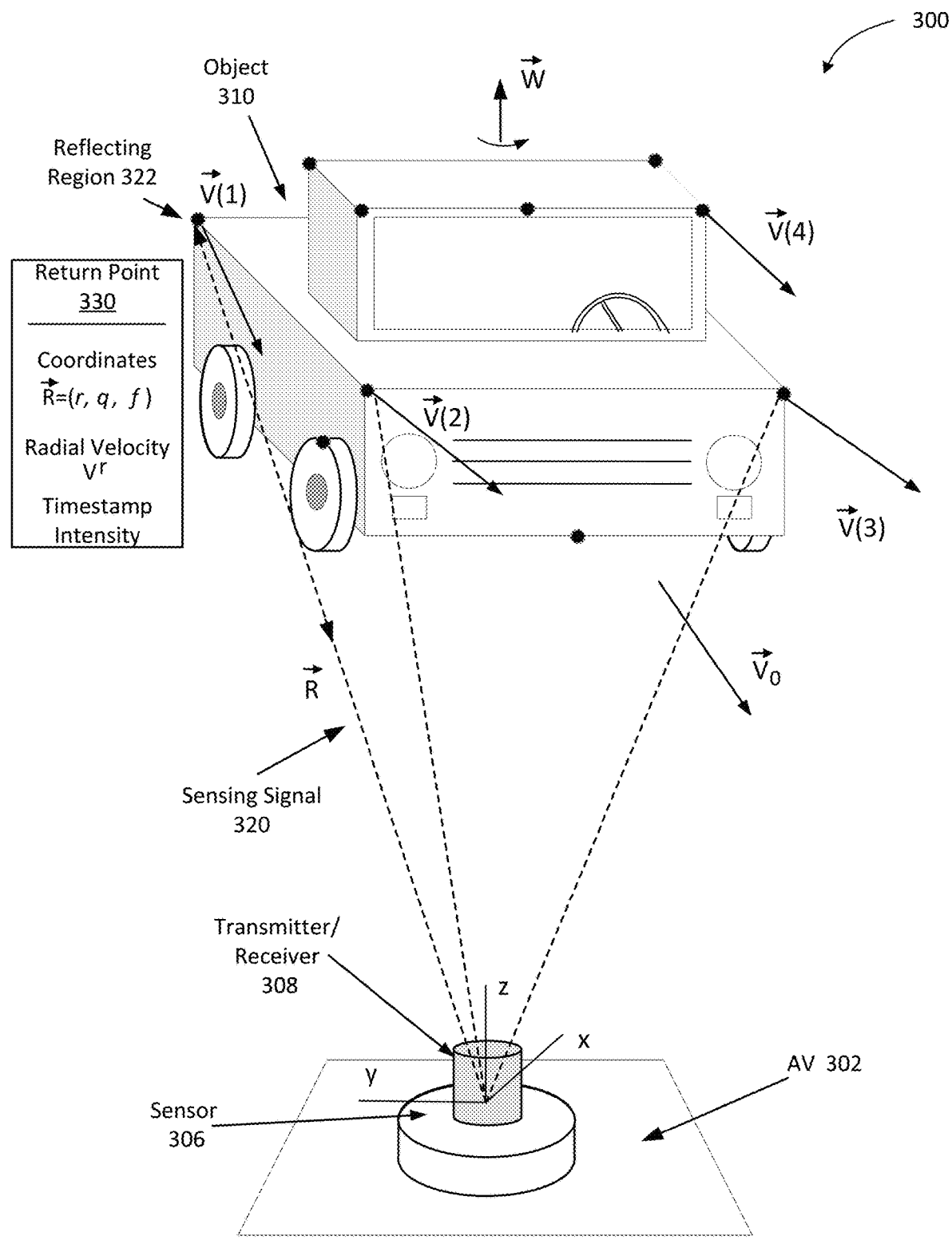
FIG. 3 is an illustration of a velocity reconstruction setup, as part of a perception system of an autonomous vehicle, in accordance with some implementations of the present disclosure.

FIG. 3 is an illustration 300 of a velocity reconstruction setup, as part of a perception system of an autonomous vehicle, in accordance with some implementations of the present disclosure. Depicted is an object 310 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 302 with a sensor 306 mounted thereon. Sensor 306 can include a rotating transmitter/receiver 308 capable of transmitting and receiving sensing (e.g., laser, radar, etc.) signals that scan the outside (relative to AV 302) environment. One sensing frame that corresponds to a single cycle of the transmitter/receiver 308 can produce multiple return points from various reflecting regions (depicted with black circles) of the object 310.

A sensing signal 320 can be emitted by a transmitting circuit of the transmitter/receiver 308, reflect from a reflecting region 322 of the object 310, return along the same path and be received by a receiving circuit of the transmitter/receiver 308. The sensing system 120 can associate a return point 330 with the sensing signal 320 and/or reflecting region 322. The return point 330 can include various data that can be extracted from the sensing signal 320, such as the coordinates (which can be in any appropriate system of coordinates, e.g., Cartesian coordinates $\vec{R}=(x,y,z)$, spherical coordinates $\vec{R}=(r,\theta,\phi)$, cylindrical coordinates $\vec{R}=(r,\phi,z)$, or any other system of coordinates); the origin of the coordinate system can be associated with the transmitter/receiver 308, as shown. The return point can also include such data as the radial velocity $V_r$, a timestamp t associated with the sensing signal 320 (e.g., the time of the signal emission or return), the intensity of the returned signal, and other information such as the polarization of the emitted and/or received signal, and the like.

Although only the data associated with the return point 330 is depicted in FIG. 3, other return points associated with the reflecting regions depicted with black circles can include the same or similar type of information. Because the object 310 can be rotating, the velocities of each of the reflecting regions, $\vec{V}(1)$, $\vec{V}(2)$, $\vec{V}(3)$, $\vec{V}(4)$ . . . , can be different from each other. Correspondingly, the detected radial velocities associated with each return point, $V_r(1)$, $V_r(2)$, $V_r(3)$, $V_r(4)$ . . . , can likewise be different from each other. Specifically, if the object 310 is a rigid body, the velocity of an element of the object having a radius-vector R can be found from the rigid body equation:

$$\vec{V}=\vec{V}_O+\vec{\Omega}\times(\vec{R}-\vec{R}_O),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\vec{V} = \vec{V}_O + \vec{\Omega}\times\left(\vec{R}-\vec{R}_{O'}-\vec{R}_O+\vec{R}_{O'}\right) = \vec{V}_{O'} + \vec{\Omega}\times\left(\vec{R}-\vec{R}_{O'}\right),$$

where $\vec{V}_{O'}=\vec{V}_O+\vec{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the cluster of points detected by the sensing system 120).

Figure 4:
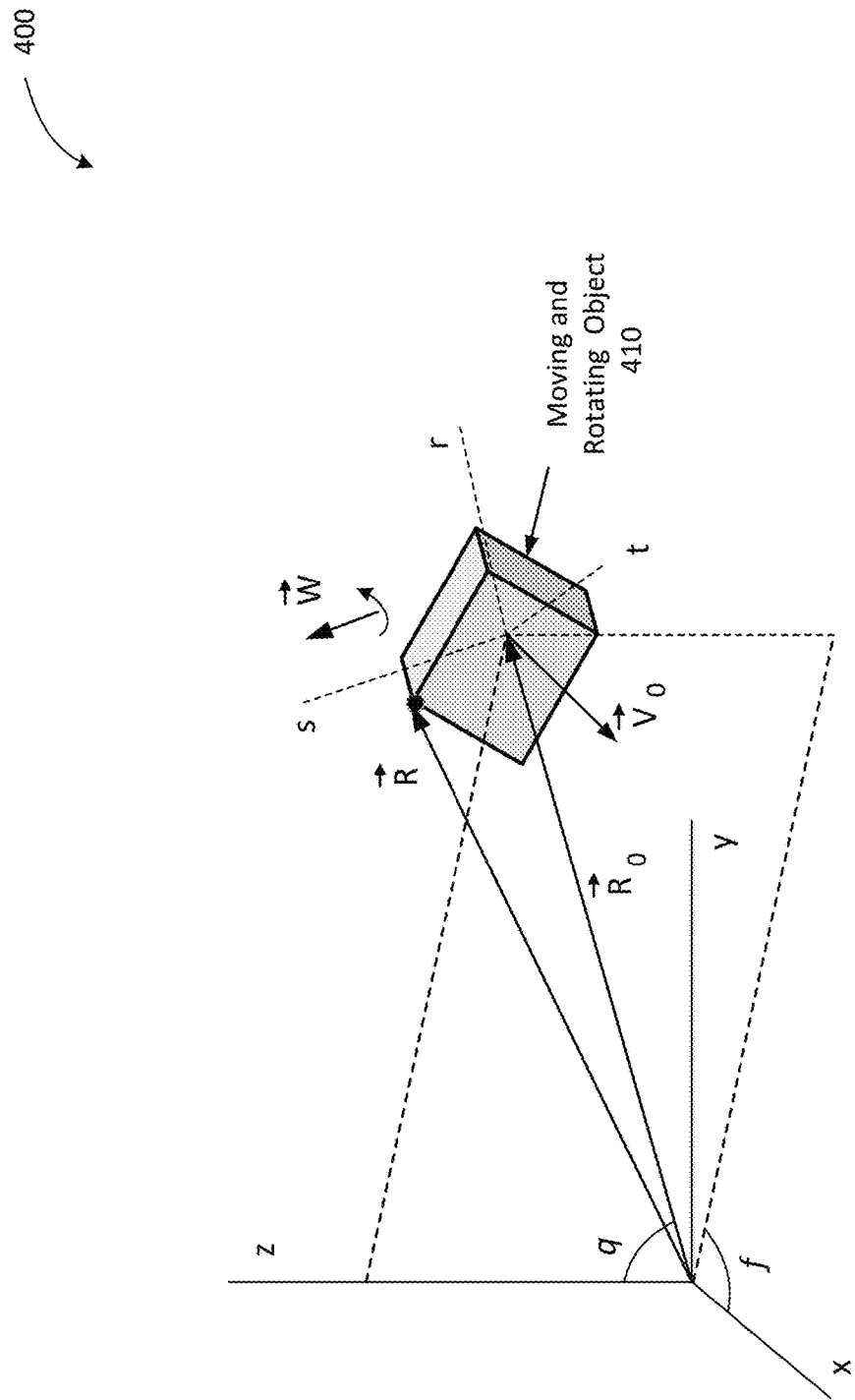
FIG. 4 is a schematic depiction of one possible geometric representation that can be used by a perception system of an autonomous vehicle, in accordance with some implementations of the present disclosure.

FIG. 4 is a schematic depiction of one possible geometric representation 400 that can be used for velocity reconstruction of object motion by a perception system of an autonomous vehicle, in accordance with some implementations of the present disclosure. Depicted schematically is a moving and rotating object 410 (e.g., a car, a plane, a body of a motorcycle, etc.) having translational velocity $\vec{V}_O$ and angular velocity $\vec{\Omega}$. Shown is a fixed system of coordinates x, y, z which can be associated with the AV (not shown), e.g., with any axes having fixed directions relative to the AV. A reference point $\vec{R}_0$ can be chosen (in some arbitrary manner) within a cluster of the return points. The reference point $\vec{R}_0$ can be chosen independently for any cluster of return points. For example, a first cluster of points corresponding to a truck located straight ahead relative to the AV can be analyzed using one reference point (e.g., some point in the middle of the cluster) whereas a second cluster of points, corresponding to a car located to the left of the AV, can be analyzed using a completely different reference point $\vec{R}_0$.

A second coordinate system can be associated with the reference point, e.g., a system of coordinates r, s, t in which the first axis r is parallel to the direction of the radius vector $\vec{R}_0$, axis t is perpendicular to axis r and parallel to the horizontal plane xy, and axis s is perpendicular to both the first axis and the second axis. The directions (unit vectors) of the axes of the second coordinate system in terms of the polar angle $\theta$ and azimuthal angle $\phi$ of the radius vector $\vec{R}_0$ are $\hat{r}=\sin\theta\cos\phi\hat{x}+\sin\theta\sin\phi\hat{y}+\cos\theta\hat{z}$ $\hat{s}=-\cos\theta\cos\phi\hat{x}-\cos\theta\sin\phi\hat{y}+\sin\theta\hat{z},$ $\hat{t}=\sin\phi\hat{x}-\cos\phi\hat{y}.$ The radial component of the velocity ("radial velocity"), as detected by, e.g., the LiDAR sensor is the dot product of the velocity $\vec{V}$ and the unit vector along the direction of the radius-vector of the return point $\vec{R}$: $V_r=\vec{V}\cdot\vec{R}/R$, where R is the magnitude of the radius vector (e.g., the distance from the sensor to the return point). According to the rigid body equation, the radial velocity is $$V_r = \vec{V}_O \cdot \frac{\vec{R}}{R} + \left(\vec{R}_O \times \vec{\Omega}\right) \cdot \frac{\vec{R}}{R}.$$

In certain implementations, return points detected by an FMCW sensor can include information from which radial velocity can be derived directly. The transmission signal of the FMCW sensor (or FMCW signal) is a frequency-modulated signal from which both ranging and radial velocity can be extracted. Different types of frequency-modulated signals may be used to modulate the transmitted signal including, but not limited to, sawtooth modulation, triangular modulation, square-wave modulation, stepped modulation, and sinusoidal modulation. Triangular modulation may be particularly useful as it readily allows for radial velocity to be computed by comparing the "beat frequencies" between the transmitted signals and the reflected signals at rising and falling portions of the triangular waveform of frequency as a function of time. The beat frequency is the difference between the actual frequency of the transmission signal and the frequency of the delayed reflected signal. The Doppler shift, $f_D$, is then computed based on the beat frequency measured for the rising half of the triangular signal, $f_1$, and the beat frequency measured for the falling half of the triangular signal, $f_2$. That is, $$f_D = \begin{cases} \frac{f_1+f_2}{2}, & f_2 > f_1 \\ -\frac{f_1+f_2}{2}, & f_2 < f_1 \end{cases}.$$

The radial velocity for a given return point is then computed as $$V_r = \frac{f_D \lambda}{2}$$

where λ is the optical wavelength of the operating frequency of the transmission signal.

Figure 5A:
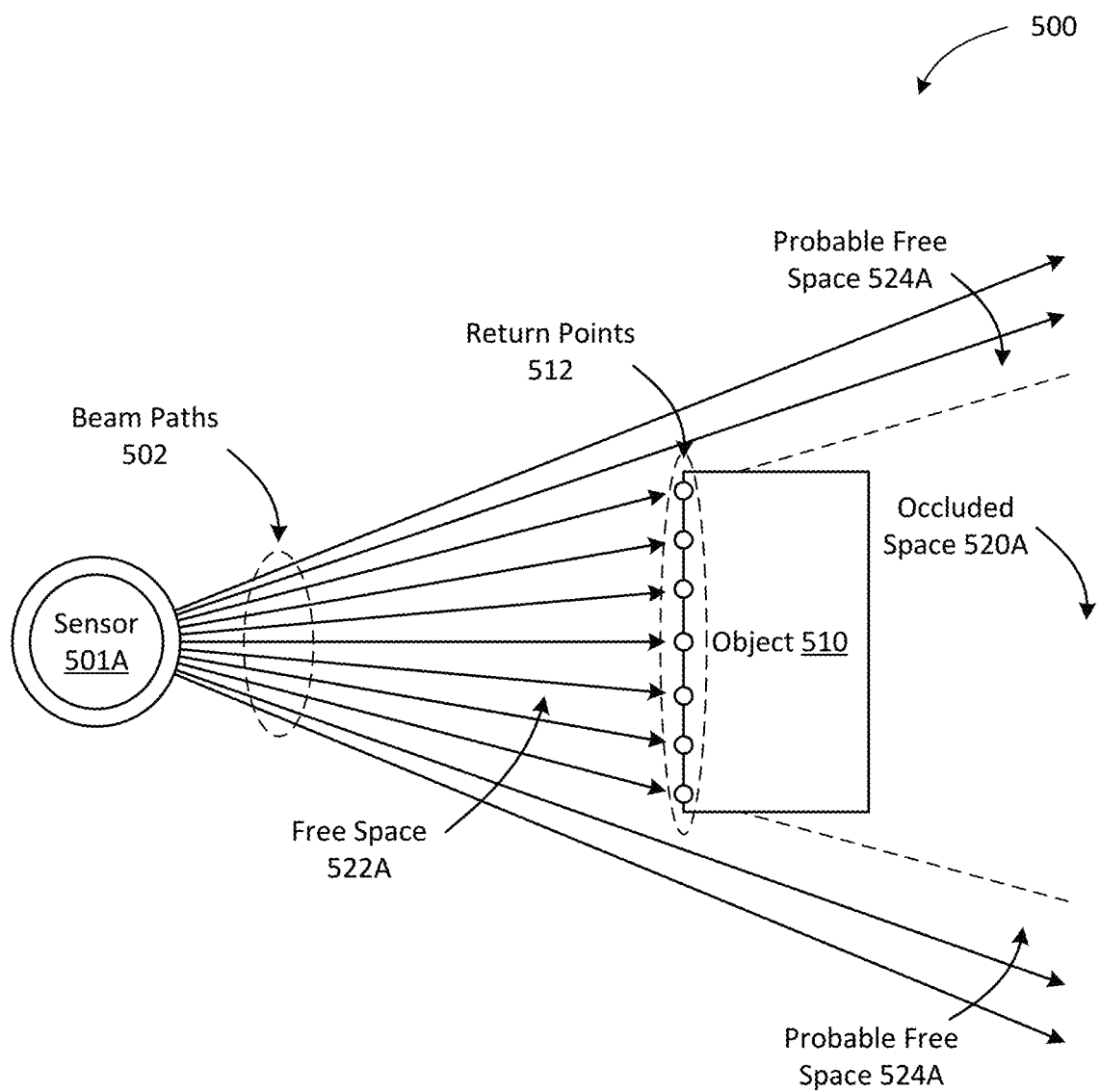
FIG. 5A is an illustration of return point generation by a single LiDAR sensor 501A in an environment in accordance with some implementations of the present disclosure.

FIG. 5A is an illustration of return point generation by a single LiDAR sensor 501A in an environment 500 in accordance with some implementations of the present disclosure. The LiDAR sensor 501A is depicted as emitting a plurality of beams each characterized by radial beam paths 502A originating from the LiDAR sensor 501A and diverging with increasing radial distance. Return points 512 are generated as a result of reflections from an object 510 (e.g., a vehicle), and the return points 512 are collectively represented as point cloud data for downstream data processing. In addition to positional information and signal intensity, each return point (depicted as open circles) can have an associated radial velocity, $V_r$, with respect to the LiDAR sensor 501A that is related to the translational velocity of the object corresponding to the return point. It is noted that the environment 500 is simplified, and it is to be understood that additional return points and additional beams that trace out additional beam paths may be present.

The environment 500 includes different regions in space that can be inferred from the presence of the return points 512 and the absence of return points. Occluded space 520A can be inferred from the return points 512, corresponding to regions of the environment 500 for which the LiDAR sensor 501A cannot obtain information. The occluded space 520A includes regions of the environment 500 that are radially further from the LiDAR sensor 501A than the return points 512. Free space 522A can also be inferred from the return points 522A, corresponding to regions of the environment 500 that are free from objects that could potentially result in a collision. The free space 522A includes regions of the environment 500 that are radially closer to the LiDAR sensor 501A than the return points 512.

Probable free space 524A can be inferred from the absence of return points along beam paths for which no reflections occurred or for which an intensity of the reflected signal is below a signal detection threshold of the LiDAR sensor 501A. Probable free space 524A corresponds to regions of the environment 500 for which there is uncertainty as to the presence or absence of objects. This uncertainty can increase with increasing radial distance from the LiDAR sensor 501A.

Figure 5B:
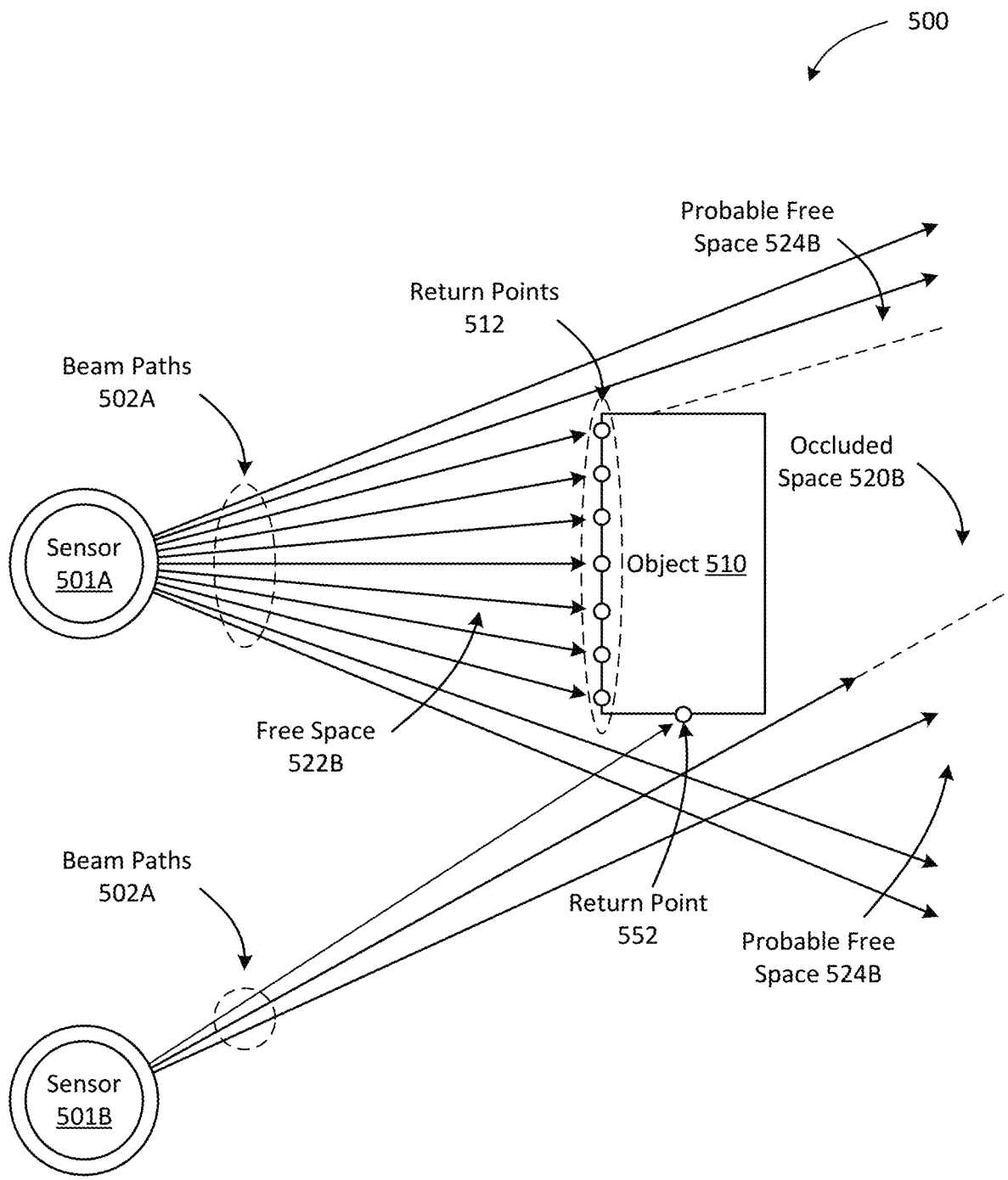
FIG. 5B is an illustration of spatial inferences that can be made when multiple LiDAR sensors are utilized in the same environment in accordance with some implementations of the present disclosure.

FIG. 5B is an illustration of spatial inferences that can be made when multiple LiDAR sensors are utilized in the same environment 500 in accordance with some implementations of the present disclosure. In addition to the LiDAR sensor 501A depicted in the environment 500, a LiDAR sensor 501B can be used to transmit a signal to regions of the environment 500 that are inaccessible to the LiDAR sensor 501A, which is a result of the parallax between the sensors 501A and 501B. As shown, beam paths 502B are able to enter the occluded space 520A and generate additional return points, such as the return point 552 that is occluded from the sensor 501A. The beam paths 502A and 502B collectively define occluded space 520B, free space 522B, and probable free space 524B. Using multiple LiDAR sensors in this way can provide a significant amount of additional information about the shapes and sizes of objects and surrounding environment.

Figure 6:
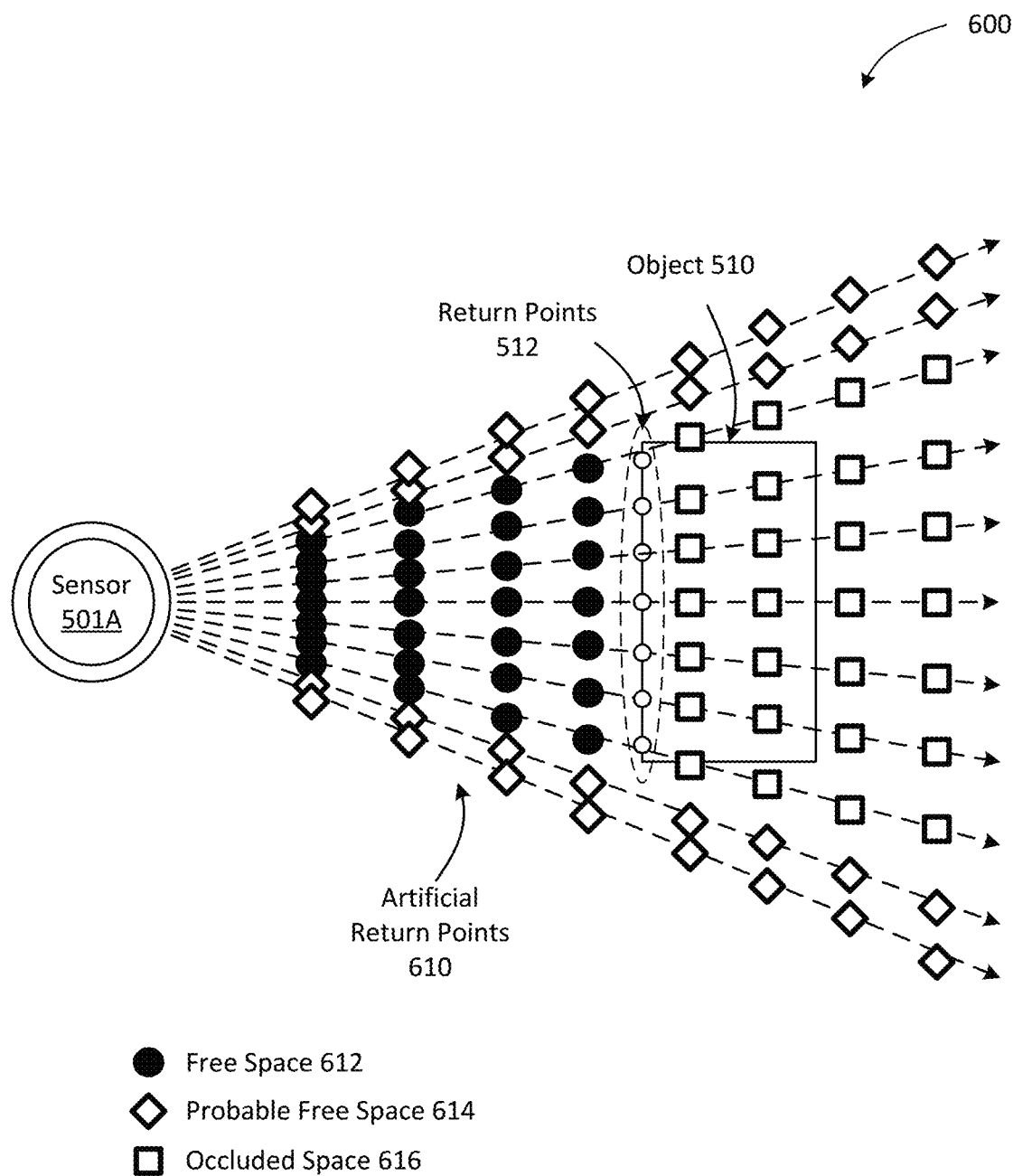
FIG. 6 is an illustration of artificial return points generated in an environment based on presence and absence of return points in accordance with some implementations of the present disclosure.

FIG. 6 is an illustration of artificial return points 610 generated in an environment 600 based on presence and absence of return points 512 in accordance with some implementations of the present disclosure. In such implementations, the artificial return points 610 augment point cloud data to represent free space information in a way that facilitates use of the point cloud data in machine learning models. The artificial return points 610 may can have the same or a similar data representation as the return points 512, as well as an additional type identifier that differentiates the artificial return points 610 from each other and the return points 512.

In some implementations, a first type of the artificial return points 610 includes free space return points 612 (shown as black circles), which represent regions of the environment 600 that are free of objects with a high or maximum level of confidence. A given free space return point 612 may be generated and placed along a radial path between the LiDAR sensor 501A and a corresponding return point as a strong indication that the path from the LiDAR sensor 501A to the return point is clear of objects.

In some implementations, a second type of the artificial return points 610 includes occluded space return points 616 (shown as open squares), which represent regions of the environment 600 for which no information is available. A given occluded space return point 616 may be generated and placed along a radial path beyond a corresponding return point, and may in some implementations be treated as corresponding to the presence of an object due to the lack of information available to the LiDAR sensor 501A.

In some implementations, a third type of the artificial return points 610 includes probable free space return points 614 (shown as open diamonds), which represent regions of the environment 600 that are likely to be clear but with lower confidence than the free space return points 612. A given probable free space return point 614 may be generated and placed along a radial path for which there is an absence of a return point. A return point may be absent if the emitted beam did not reflect from any object in its path. Alternative reasons for absence may be the presence of a dark object that absorbed energy of the emitted beam, or the presence of a reflective object that reflected the emitted beam away from the LiDAR sensor 501A. In both of these latter situations, the reflected signal may be insufficient to register as a return point by the LiDAR sensor 501A (e.g., the reflected signal is below a minimum detectable threshold).

In some implementations, the artificial return points 610 are generated at regular intervals within the environment 600, for example, at predefined spacings along radial paths (e.g., beam paths 502A). In some implementations, a spacing between artificial return points 610 along a radial path ranges from 1 cm to 100 cm (e.g., 1 cm to 10 cm, 10 cm to 20 cm, etc.). In some implementations, the spacing may vary as a function range (e.g., shorter spacing at closer ranges to the sensor 501A and longer spacing at further ranges from the sensor 501A). In some implementations, the spacings, size of the sampling area within the environment 600, and/or the number of artificial return points 610 may be selected based on specifications or requirements of a machine learning algorithm for which the augmented point cloud data is used as input. In some implementations, artificial return points 610 need not be confined to radial paths of the emitted beams, and may be placed at arbitrary coordinates based on the presence or absence of return points. For example, free space return points 612 may be arranged in a rectangular array, a hexagonal array, or in any other suitable arrangement.

Traditional point cloud representations of pedestrians only contain information about which parts of the pedestrian's body are sensed, and provides little information that could be used by a machine learning model to distinguish between, for example, the head, the upper torso, and the arms. As an example use case, augmented point cloud data, generated based on the various implementations described herein, could be used to incorporate free space information such as gaps between the pedestrian's torso and arms. This information could be used to make evident the separation between body parts, and allow a machine learning model to further identify the pedestrian's head. For example, given that the approximate size of a human head is 30 centimeters in diameter, the machine learning model can further infer that the width of this region of the pedestrian's body (e.g., the detected object) cannot be greater than 30 centimeters. Additional, if part of the pedestrian's body is partially occluded, the augmented point cloud data can inform the machine learning model that the occluded region of the environment should be factored into the analysis.

Figure 7:
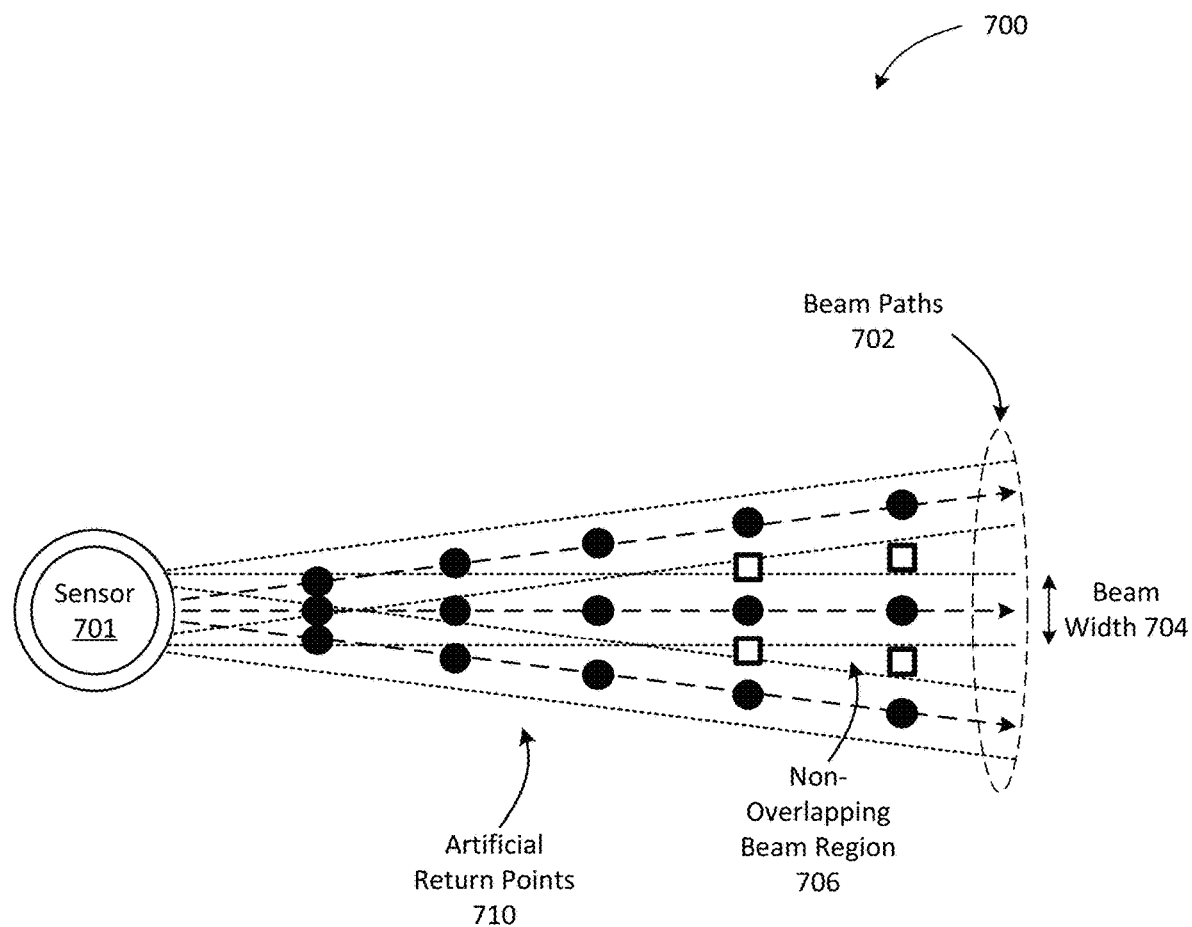
FIG. 7 is an illustration of occluded space return points generated within a non-overlapping beam region between neighboring free space return points in an environment in accordance with some implementations of the present disclosure.

FIG. 7 is an illustration of occluded space return points 714 generated within a non-overlapping beam region 706 between neighboring free space return points 712 in an environment 700 in accordance with some implementations of the present disclosure. Artificial return points 710 may be generated as a result of return points (not shown) detected by the sensor 701. As shown, each of the beam paths 702 originating from the sensor 701 have a finite beam width 704. In some implementations, the sensor 701 may be designed to select beam widths, beam divergences, and angles between beams to maintain overlap between beams within a region of the environment 700 to be sensed. In other implementations, as the beams diverge with increasing distance, a lateral distance between neighboring or adjacent beams increases, resulting in non-overlapping beam regions 706 within the region of the environment 700 to be sensed. Objects may be present within the non-overlapping beam regions 706 for which return points cannot be generated. In some implementations, to account for this lack of information, occluded space return points 714 may be generated within the non-overlapping beam regions 706, for example, between neighboring pairs of free space return points 712.

Figure 8:
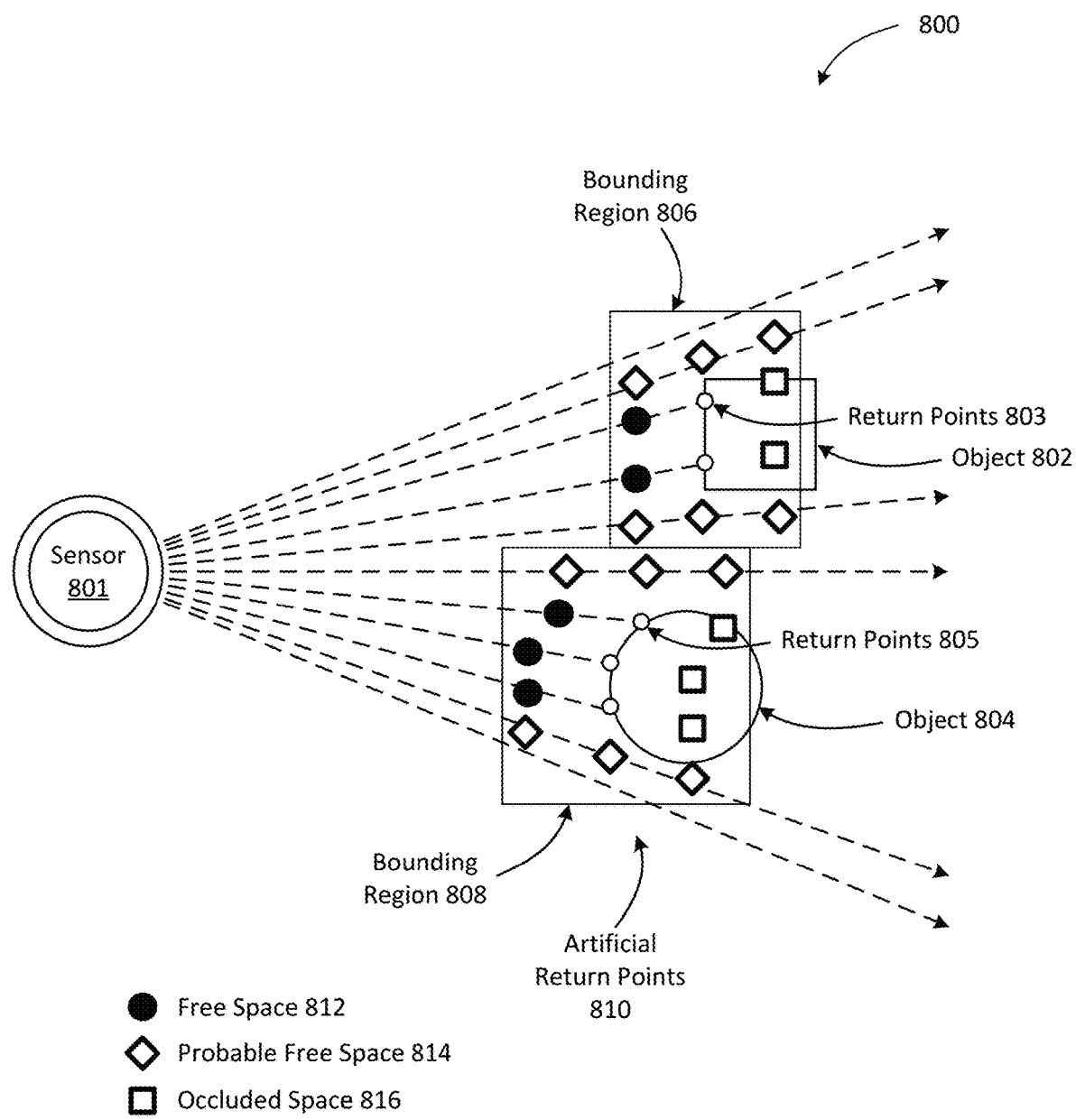
FIG. 8 is an illustration of artificial return points generated within the vicinity of return points in an environment in accordance with some implementations of the present disclosure.

FIG. 8 is an illustration of artificial return points 810 generated within the vicinity of return points 803 and 804 in an environment 800 in accordance with some implementations of the present disclosure. In the implementation shown, the generation of artificial return points 810 in FIG. 8 exemplifies a reduced representation compared to the more complete representation of artificial return points 610 of FIG. 6. Return points 803 are generated by reflections from an object 802, and return points 805 are generated by reflections from an object 804. In some implementations, artificial return points 810, including free space return points 812, probable free space return points 814, and occluded space return points 816, are generated within bounding regions 808 and 810 of their respective objects 802 and 804. The bounding regions 808 and 810 may be determined, for example, by "enclosing" clusters of return points such that each return point is surrounded by neighboring points, which can include artificial return points and traditional return points. In some implementations, artificial return points are generated before and after a given return point on a given radial path. If R is the radial distance of a return point from the sensor 801, artificial return points may be generated at the radial distances R±D, where D may be a fixed spacing (e.g., from 1 cm to 20 cm, from 5 cm to 15 cm, about 10 cm, etc.). In some implementations, artificial return points are generated along one or more adjacent radial paths, for example, at R' and R'±D, where R' corresponds to coordinates along the adjacent radial path, and |R|=|R'|. Such implementations advantageously reduce storage costs and improve the efficiency of data generation and processing by reducing an overall amount of data points in the augmented point cloud data.

Figure 9:
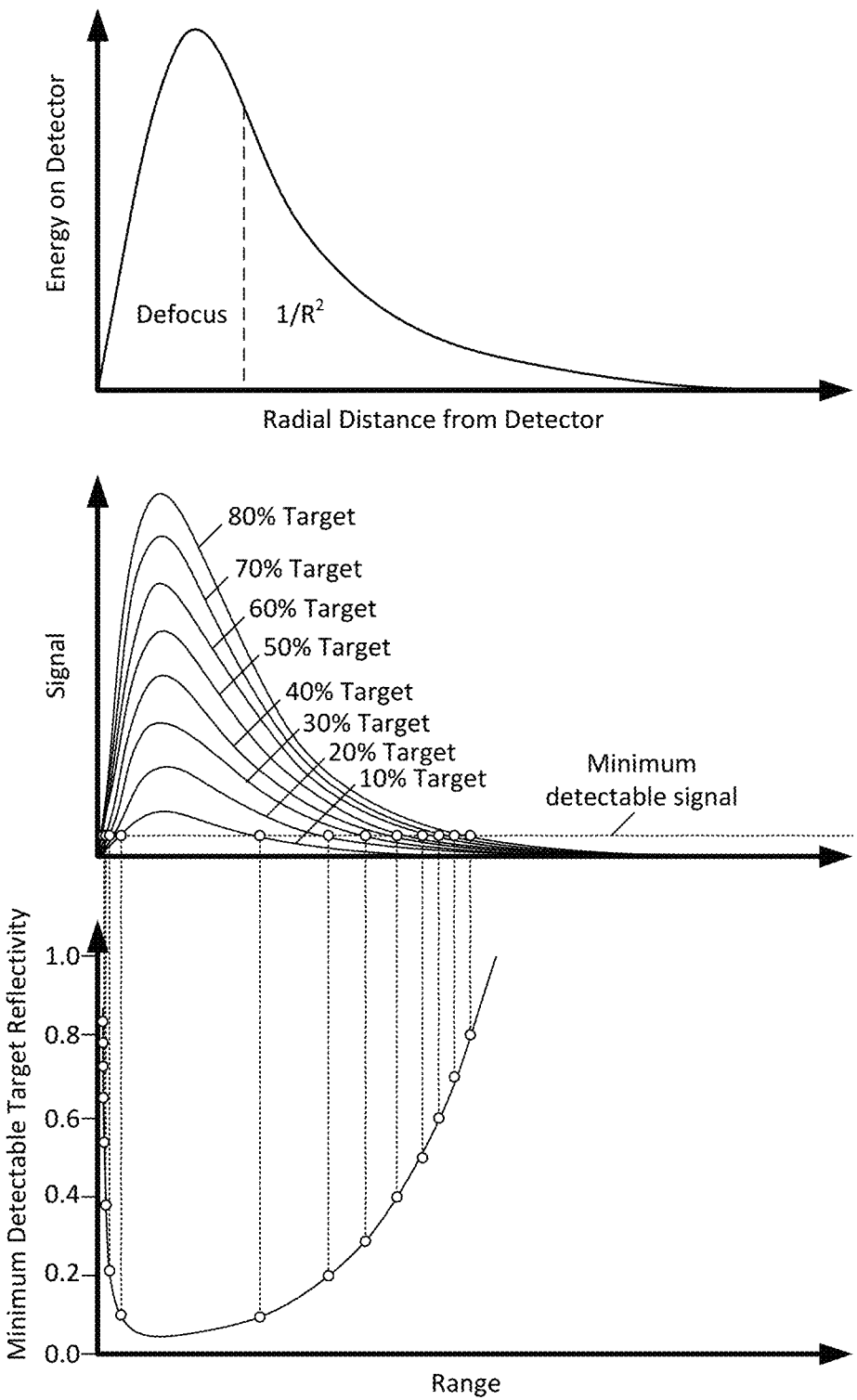
FIG. 9 includes plots of a LiDAR signal as a function of range and maximum target reflectivity as a function of range.

FIG. 9 includes plots of a LiDAR signal as a function of range and maximum target reflectivity as a function of range. For LiDAR detectors, the detected signal energy, E, can be modeled as $$E = \frac{\sigma A}{\pi R^2} E_0$$

where $\sigma$ is the reflectivity of the target, A is the area of the detector lens, R is the range of the object (radial distance from the detector), and $E_0$ is the energy of the emitted signal. This model is accurate at long ranges, while at close ranges a diminished signal is generally detected due to defocusing of the detector optics.

As is evident from the above equation, the energy of the detected signal will vary both with range and target reflectivity. Moreover, there is a limit below which a reflection signal can be distinguished from noise, which sets a minimum detectable target reflectivity for a target at a given range. For example, a target reflecting only 5% of incident light may return enough signal to be detectable at 50 meters. At 60 meters, however, it may not be possible to detect the target at all. As illustrated in FIG. 9, the signals for various reflectivities can be used to model a minimum detectable target reflectivity curve based on a minimum detectable signal threshold.

In some implementations, artificial return points representative of probable free space (e.g., generated in the absence of return points) may be assigned intensity values based on minimum detectable target reflectivity. Intensity values computed in this way may be used to convey to a machine learning model a quantitative measure of confidence that the area is clear of objects. For example, an artificial return point having an intensity value of 0.5 is indicative of confidence that an object having 50% reflectivity or higher would have been detected at the corresponding coordinates of the artificial return point (notwithstanding any reflective or dark objects in the path between the LiDAR sensor and the artificial return point). Such implementations advantageously allow for downstream machine learning models to differentiate between return points of objects that are close to the LiDAR sensor and return points that are further from the LiDAR sensor. For example, pedestrians that are further from the LiDAR sensor may appear sparser due to smaller amounts of energy that are reflected back toward the LiDAR sensor.

Figure 10:
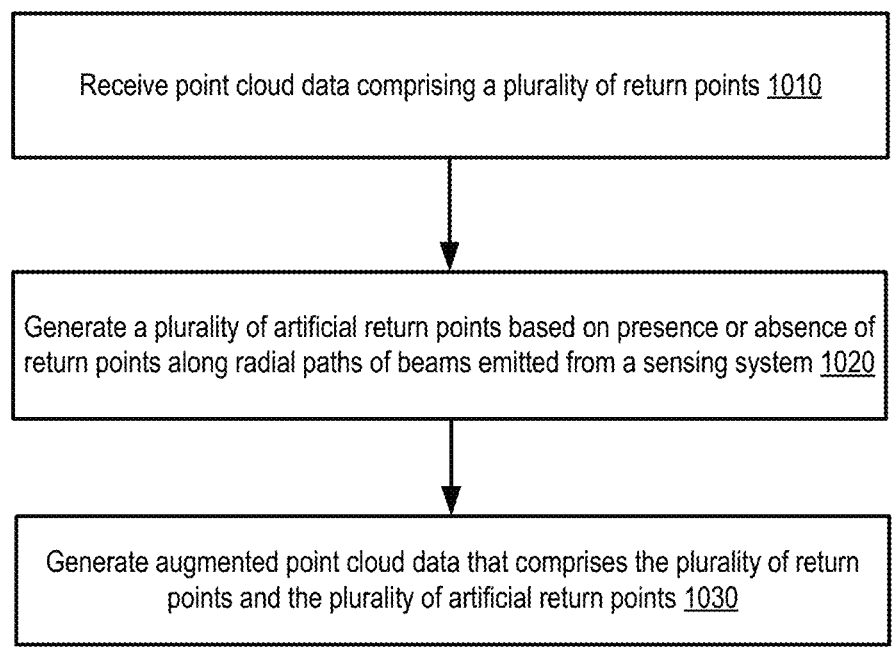
FIG. 10 depicts a flow diagram of an example method of generating augmented point cloud data that includes artificial return points in accordance with some implementations of the present disclosure.

FIG. 10 depicts a flow diagram of an example method 1000 of generating augmented point cloud data that includes artificial return points in accordance with some implementations of the present disclosure. Method 1000 and its individual functions, routines, subroutines, or operations can be performed by a processing device, having one or more processing units (CPU) and memory devices communicatively coupled to the CPU(s). The processing device executing method 1000 can perform instructions from various components of the perception system 132, e.g., the PCAM 133. In certain implementations, method 1000 can be performed by a single processing thread. Alternatively, method 1000 can be performed by two or more processing threads, each thread executing one or more individual functions, routines, subroutines, or operations. In an illustrative example, the processing threads implementing method 1000 can be synchronized (e.g., using semaphores, critical sections, and/or other thread synchronization mechanisms). Alternatively, the processing threads implementing method 1000 can be executed asynchronously with respect to each other. Various operations of method 1000 can be performed in a different order compared with the order shown FIG. 10. Some operations of the methods can be performed concurrently with other operations, and some operations can be optional.

Method 1000 can be directed to systems and components of an autonomous driving vehicle, such as the AV 100 of FIG. 1. Method 1000 can be used to improve performance of the data processing system 130 and/or the AVCS 140, and may be applied to each detected return point in a point cloud in sequence or concurrently. At block 1010, a perception system (e.g., the perception system 132) of, for example, an AV receives data representative of a point cloud ("point cloud data") comprising a plurality of return points. Each return point may be representative of a reflecting region of an object that reflects a beam emitted by a sensing system (e.g., the sensing system 120), for example, as illustrated in FIG. 5A where return points 512 are generated from reflected signals from an object 510 that are detected by a LiDAR sensor 501A. Each return point may also have a corresponding radial velocity and corresponding position coordinates representative of the reflecting region. Obtaining return points can include some or all of the following. One or more sensors (e.g., LiDAR, FMCW, hybrid ToF/coherent LiDAR, and so on) of the sensing system of the AV can emit a series of beams (e.g., optical signals). The beams can be emitted in a periodic (cyclic) pattern in various directions, for example, radially forming the 360-degree panoramic pattern. The beams can strike various objects (moving or stationary) and reflect back toward the sensor from various reflecting regions of the objects. The number of reflecting regions can vary depending on the nature, size of the object, and the object's level of occlusion by other objects. The intensity of reflected signals can depend on the physical properties (i.e., material, surface type, etc.) of the reflecting region, the wavelength of the signal, polarization, etc. Based on the characteristics and timing of the reflected signals, the sensing system of the AV can generate the plurality of return points. The return points are data entries that are each associated with a reflection of one of the emitted beams from an object of the environment, and can be generated in real time. Each return point can include various data entries, such as a timestamp of a cycle of the sensor, intensity of the reflected signals, or polarization of the reflected signals. Each return point can include two or more coordinates of the respective reflecting region. For example, the coordinates can be a distance to the reflecting region (e.g., determined from the time of flight of the reflected signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system toward the reflecting region.

In some implementations, the sensor can be a coherent LiDAR capable of detecting the radial velocity using, e.g., Doppler-assisted sensing. In some implementations, the coherent LiDAR can be a frequency-modulated continuous-wave LiDAR and the beams emitted by the sensor can include phase-modulated or frequency-modulated electromagnetic waves. The sensor can also be capable of concurrently emitting various other signals, such as pulsed signals, which can be used for ToF distance measurements. In some implementations, the sensor can include separate ToF LiDAR and a coherent LiDAR, each emitting separate signals that can be synchronized, mixed, and transmitted along the same optical paths. In certain implementations, the sensor is an FMCW LiDAR configured to transmit and receive FMCW signals. In certain implementations, radial velocity values may be derived from each of the plurality of return points based on reflected FMCW signals.

The return points can belong to (e.g., be associated with) various sensing frames corresponding to different cycles (e.g., revolutions) of the transmitter(s) of the sensing system. For example, a first sensing frame can correspond to a first cycle, a second sensing frame can correspond to a different (e.g., earlier or later) cycle. The terms "first" and "second" should be understood as identifiers only and should not presuppose a specific order. In particular, there can be an arbitrary number of intervening frames between the first frame and the second frame.

At block 1020, the perception system generates plurality of artificial return points (e.g., artificial return points 610) based on presence or absence of return points (e.g., return points 512) along radial paths of beams (e.g., beam paths 502) emitted from the sensing system (e.g., the LiDAR sensor 501A). In some implementations, the artificial return points are representative of probable free space along the radial paths, such as free space return points 612 (representative of a 100% probability of free space), probable free space return points 614 (representative of a probability of free space of greater than 0% and less than 100%), and occluded space return points 616 (representative of a 0% probability of free space or an unknown probability).

In some implementations, for at least one return point (e.g., the return points 512), one or more artificial return points are generated that are representative of occluded space along a respective radial path of the return point (e.g., occluded space return points 616), with each artificial return point having a larger radial distance from the sensing system than the return point.

In some implementations, for at least one return point (e.g., the return points 512), one or more artificial return points are generated that are representative of free space along a respective radial path of the return point (e.g., free space return points 612), with each artificial return point having a smaller radial distance from the sensing system than the return point. In some implementations, the perception system identifies/computes regions of the environment corresponding to non-overlapping beam regions (e.g., non-overlapping beam region 706) between pairs of return points representative of free space along adjacent radial paths, for example. One or more return points representative of occluded space can be generated in the identified non-overlapping beam regions, as illustrated by occluded free space return points 714 in FIG. 7.

In some implementations, for at least one return point (e.g., the return points 512), one or more artificial return points are generated that are representative of probable free space along a respective radial path for which a return point is absent (e.g., probable free space return points 614). In some implementations, each artificial return point comprises an intensity value indicative of a likelihood of an object within a reflectivity range being detectable at a location of the artificial return point. In some implementations, the intensity value for a given artificial return point representative of probable free space is computed as a minimum detectable target reflectivity based on a radial distance of the artificial return point from the sensing system and a signal detection threshold of the sensing system.

In some implementations, the perception system generates artificial return points only within a pre-defined range of return points present along the radial paths and along radial paths of adjacent beams, as illustrated in FIG. 8. For example, artificial return points may be generated within a predefined distance from a return point, such as within a meter, within 50 centimeters, within 10 centimeters, etc. In some implementations, a number of artificial return points within the predefined distance may be determined based on a predefined spacing interval (e.g., 5 centimeter interval, 10 centimeter interval, etc.) along a given radial path.

At block 1030, the perception system generates augmented point cloud data that comprises the plurality of return points (i.e., the original return points detected by the sensing system) and the plurality of artificial return points. In some implementations, the perception system identifies objects using the augmented point cloud data. In certain implementations, method 1000 can continue with an AV control system (e.g., AVCS 140) causing a driving path of the AV to be determined in view of the identified objects. For example, the perception system could have identified an object moving with the speed of 20 mph while making a left-hand turn with the radius of 15 meters and communicated this information to the AV control system. The AV control system can then determine that the AV is about to enter the same intersection before the object can compete the turn. The AV control system can determine a new path for the AV, which can include braking, changing lanes, stopping, backing up, and so on. The control system can subsequently output instructions to powertrain and steering 150, vehicle electronics 160, signaling 170, etc., to ensure that the AV follows the determined driving path.

Figure 11:
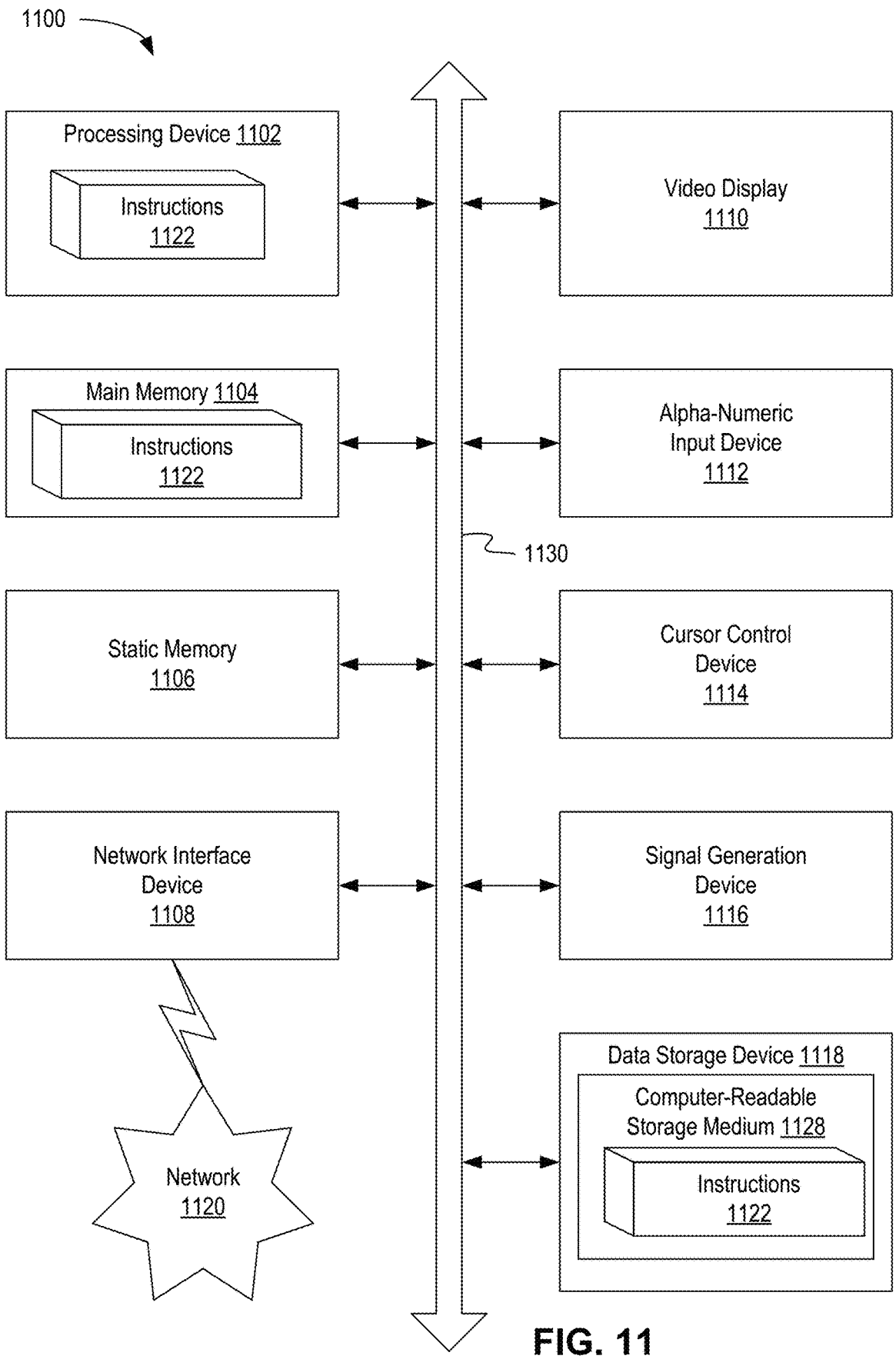
FIG. 11 depicts a block diagram of an example computer device capable of enabling Doppler-assisted object identification, tracking, and prediction for autonomous driving vehicle applications.

FIG. 11 depicts a block diagram of an example computer device 1100 capable of enabling Doppler-assisted object identification, tracking, and prediction for autonomous driving vehicle applications. Example computer device 1100 can be connected to other computer devices in a LAN, an intranet, an extranet, and/or the Internet. Computer device 1100 can operate in the capacity of a server in a client-server network environment. Computer device 1100 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1100 can include a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processing device 1102 represents one or more general-purpose processing devices such as a microprocessor, central processing unit, or the like. More particularly, processing device 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1102 can be configured to execute instructions 1122 performing method 1000 as described above.

Example computer device 1100 can further comprise a network interface device 1108, which can be communicatively coupled to a network 1120. Example computer device 1100 can further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 can include a computer-readable storage medium (or, more specifically, a non-transitory computer-readable storage medium) 1128 on which is stored one or more sets of executable instructions 1122. In accordance with one or more aspects of the present disclosure, executable instructions 1122 can comprise executable instructions for performing the method 1000 as described above.

Executable instructions 1122 can also reside, completely or at least partially, within main memory 1104 and/or within processing device 1102 during execution thereof by example computer device 1100, main memory 1104 and processing device 1102 also constituting computer-readable storage media. Executable instructions 1122 can further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "generating," "detecting," "applying," "removing," "identifying," "determining," "storing," "adjusting," "causing," "returning," "comparing," "creating," "stopping," "loading," "copying," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving, by a data processing system of an autonomous vehicle (AV), point cloud data comprising a plurality of return points, each return point being representative of a reflecting region that reflects a beam emitted by a sensing system;
   generating a plurality of artificial return points based on presence or absence of return points along radial paths of beams emitted from the sensing system, wherein the artificial return points are representative of probable free space along the radial paths;
   generating augmented point cloud data that comprises the plurality of return points and the plurality of artificial return points; and
   causing a driving path of the AV to be determined based on the augmented point cloud data.

2. The method of claim 1, wherein generating the plurality of artificial return points comprises:
   generating, for at least one return point, one or more artificial return points representative of occluded space along a respective radial path of the return point, the one or more artificial return points having a larger radial distance from the sensing system than the return point.

3. The method of claim 1, wherein generating the plurality of artificial return points comprises:
   generating, for at least one return point, one or more artificial return points representative of free space along a respective radial path of the return point, the one or more artificial return points having a smaller radial distance from the sensing system than the return point.

4. The method of claim 3, wherein generating the plurality of artificial return points comprises:
   identifying a non-overlapping beam region between a pair of artificial return points representative of free space along adjacent radial paths; and
   generating at least one artificial return point representative of occluded space in the non-overlapping beam region.

5. The method of claim 1, wherein generating the plurality of artificial return points comprises:
   generating one or more artificial return points representative of probable free space along a radial path for which a return point is absent, wherein each artificial return point representative of probable free space comprises an intensity value indicative of a likelihood of an object within a reflectivity range being detectable at a location of the artificial return point.

6. The method of claim 5, wherein the intensity value is computed as a minimum detectable target reflectivity based on a radial distance of the artificial return point from the sensing system and a signal detection threshold of the sensing system.

7. The method of claim 1, wherein generating the plurality of artificial return points comprises:
   generating the one or more artificial return points only within a pre-defined range of return points present along the radial paths and along radial paths of adjacent beams.

8. A system comprising:
   a sensing system of an autonomous vehicle (AV); and
   a data processing system operatively coupled to the sensing system, wherein the sensing system is to:
      receive point cloud data comprising a plurality of return points, each return point being representative of a reflecting region that reflects a beam emitted by the sensing system;
      generate a plurality of artificial return points based on presence or absence of return points along radial paths of beams emitted from the sensing system, wherein the artificial return points are representative of probable free space along the radial paths; and generate augmented point cloud data comprising the plurality of return points and the plurality of artificial return points; and an autonomous vehicle control system to cause a driving path of the AV to be determined based on the augmented point cloud data.

9. The system of claim 8, wherein to generate the plurality of artificial return points, the data processing system is to further:

generate, for at least one return point, one or more artificial return points representative of occluded space along a respective radial path of the return point, the one or more artificial return points having a larger radial distance from the sensing system than the return point.

10. The system of claim 8, wherein to generate the plurality of artificial return points, the data processing system is to further:

generate, for at least one return point, one or more artificial return points representative of free space along a respective radial path of the return point, the one or more artificial return points having a smaller radial distance from the sensing system than the return point.

11. The system of claim 10, wherein to generate the plurality of artificial return points, the data processing system is to further:

identify a non-overlapping beam region between a pair of artificial return points representative of free space along adjacent radial paths; and generate at least one artificial return point representative of occluded space in the non-overlapping beam region.

12. The system of claim 8, wherein to generate the plurality of artificial return points, the data processing system is to further:

generate one or more artificial return points representative of probable free space along a radial path for which a return point is absent, wherein each artificial return point representative of probable free space comprises an intensity value indicative of a likelihood of an object within a reflectivity range being detectable at a location of the artificial return point.

13. The system of claim 12, wherein the intensity value is to be computed as a minimum detectable target reflectivity based on a radial distance of the artificial return point from the sensing system and a signal detection threshold of the sensing system.

14. The system of claim 8, wherein to generate the plurality of artificial return points, the data processing system is to further:

generate the one or more artificial return points only within a pre-defined range of return points present along the radial paths and along radial paths of adjacent beams.

15. A non-transitory computer-readable medium having instructions stored thereon that, when executed by a computing device of an autonomous vehicle (AV), cause the computing device to:

receive point cloud data comprising a plurality of return points, each return point being representative of a reflecting region that reflects a beam emitted by a sensing system of the AV;

generate a plurality of artificial return points based on presence or absence of return points along radial paths of beams emitted from the sensing system, wherein the artificial return points are representative of probable free space along the radial paths;

generate augmented point cloud data comprising the plurality of return points and the plurality of artificial return points; and cause a driving path of the AV to be determined based on the augmented point cloud data.

16. The non-transitory computer-readable medium of claim 15, wherein to generate the plurality of artificial return points, the computing device is to further:

generate, for at least one return point, one or more artificial return points representative of occluded space along a respective radial path of the return point, the one or more artificial return points having a larger radial distance from the sensing system than the return point.

17. The non-transitory computer-readable medium of claim 15, wherein to generate the plurality of artificial return points, the computing device is to further:

generate, for at least one return point, one or more artificial return points representative of free space along a respective radial path of the return point, the one or more artificial return points having a smaller radial distance from the sensing system than the return point.

18. The non-transitory computer-readable medium of claim 17, wherein to generate the plurality of artificial return points, the computing device is to further:

identify a non-overlapping beam region between a pair of artificial return points representative of free space along adjacent radial paths; and generate at least one artificial return point representative of occluded space in the non-overlapping beam region.

19. The non-transitory computer-readable medium of claim 15, wherein to generate the plurality of artificial return points, the computing device is to further:

generate one or more artificial return points representative of probable free space along a radial path for which a return point is absent, wherein each artificial return point representative of probable free space comprises an intensity value indicative of a likelihood of an object within a reflectivity range being detectable at a location of the artificial return point, wherein the intensity value is to be computed as a minimum detectable target reflectivity based on a radial distance of the artificial return point from the sensing system and a signal detection threshold of the sensing system.

20. The non-transitory computer-readable medium of claim 15, wherein to generate the plurality of artificial return points, the computing device is to further:

generate the one or more artificial return points only within a pre-defined range of return points present along the radial paths and along radial paths of adjacent beams.

* * * * *